US 6,705,102 B2

(12) United States Patent
Adaniya et al.

(10) Patent No.: US 6,705,102 B2
(45) Date of Patent: Mar. 16, 2004

(54) VEHICULAR AIR-CONDITIONER

(75) Inventors: Taku Adaniya, Kariya (JP); Masahiro Kawaguchi, Kariya (JP); Takahiro Suzuki, Kariya (JP); Masaki Ota, Kariya (JP); Akinobu Kanai, Kariya (JP); Masanori Sonobe, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/269,787

(22) Filed: Oct. 11, 2002

(65) Prior Publication Data

US 2003/0070442 A1 Apr. 17, 2003

(30) Foreign Application Priority Data

Oct. 15, 2001 (JP) ........................................ 2001-316912

(51) Int. Cl.[7] ................................................ F25B 49/00
(52) U.S. Cl. ..................... 62/228.1; 417/42; 417/44.11; 417/222.2
(58) Field of Search ................................ 62/215, 228.1, 62/228.3, 228.4, 328.6; 417/222.2, 42, 44.11, 44.1

(56) References Cited

U.S. PATENT DOCUMENTS

| | | | | |
|---|---|---|---|---|
| 5,584,670 A | * | 12/1996 | Kawaguchi et al. | ...... 417/222.2 |
| 6,230,507 B1 | * | 5/2001 | Ban et al. | ...... 62/228.4 |
| 6,247,899 B1 | * | 6/2001 | Ban et al. | ...... 417/16 |
| 6,283,722 B1 | * | 9/2001 | Takenaka et al. | ...... 417/222.2 |
| 6,290,468 B1 | * | 9/2001 | Kato et al. | ...... 417/222.2 |
| 6,336,335 B2 | * | 1/2002 | Ota et al. | ...... 62/133 |
| 6,481,225 B2 | * | 11/2002 | Kimura et al. | ...... 62/133 |
| 6,481,227 B1 | * | 11/2002 | Ota et al. | ...... 62/209 |
| 6,481,976 B2 | * | 11/2002 | Kimura et al. | ...... 417/222.2 |
| 6,484,520 B2 | * | 11/2002 | Kawaguchi et al. | ...... 62/133 |
| 6,544,004 B2 | * | 4/2003 | Fujii et al. | ...... 417/222.2 |

FOREIGN PATENT DOCUMENTS

| | | | | |
|---|---|---|---|---|
| JP | 403061163 A | * | 3/1991 | |
| JP | 10-236151 | | 9/1998 | ............ B60H/1/32 |
| JP | 2000-229516 | | 8/2000 | ............ B60H/1/32 |
| JP | 2000-230482 | | 8/2000 | ............ F04B/35/00 |

* cited by examiner

*Primary Examiner*—William E. Tapolcai
*Assistant Examiner*—Mohammad M. Ali
(74) *Attorney, Agent, or Firm*—Morgan & Finnegan, LLP

(57) ABSTRACT

An air conditioning system for a vehicle that is driven by a vehicular power source. The system has a compressor selectively operable by the vehicular power source and an electric motor. The electric motor is used as a drive force of the compressor when the vehicular power source is in a non-operative state. The compressor compresses refrigerant gas introduced into a suction chamber from an external refrigerant circuit. A displacement of the compressor is variable, based on a differential pressure. The compressor has a control valve that is disposed on a refrigerant passage communicating with the crank chamber. The control valve has a valve plunger for changing an opening size of the control valve to adjust pressure in the crank chamber. The air conditioning system comprises pressure sensing member, actuator, and controller. The pressure sensing member is disposed in the control valve and applies biasing force to the plunger based on pressure in the external circuit. The biasing force is applied to cancel change of the pressure in the external circuit. The actuator is disposed in the control valve and applies reverse force against the biasing force to the plunger. The plunger is moved to increase the displacement by the reverse force. The controller controls the actuator to increase the reverse force in steps by a magnitude that is small enough that the electric motor is able to stably drive the compressor.

14 Claims, 3 Drawing Sheets

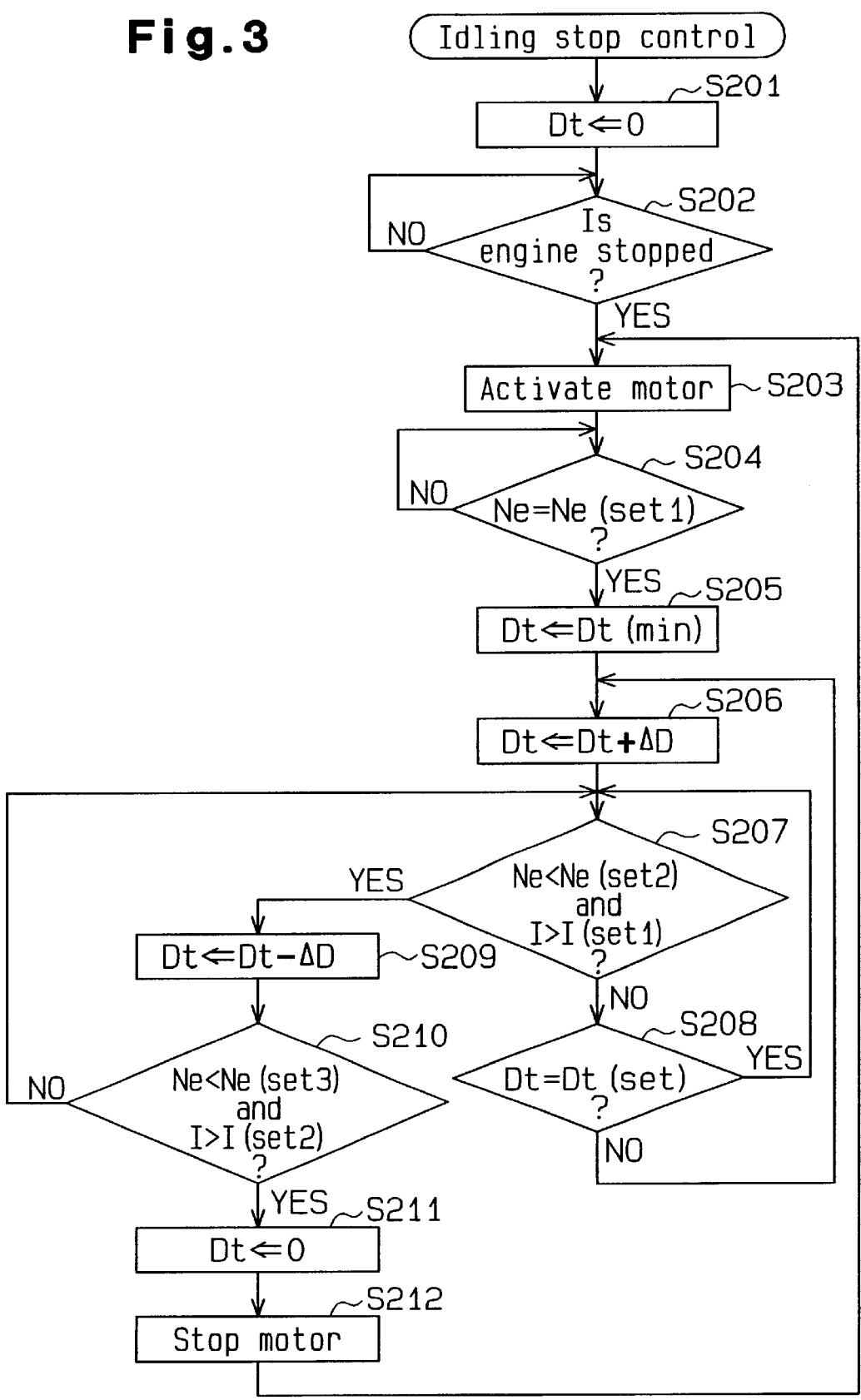

VEHICULAR AIR-CONDITIONER

BACKGROUND OF THE INVENTION

The present invention relates to a vehicular air-conditioner that has a variable displacement compressor in a refrigerant circuit. The compressor is driven by a vehicular power source such as an internal combustion engine to compress refrigerant gas and is also driven by an electric motor to compress refrigerant gas when the internal combustion engine is not running.

Recently, an idling stop system is becoming widely used to improve the fuel economy and for environmental protection. The idling stop system stops the engine when a vehicle is stopped at stoplights. A compressor, which has an electric motor as a drive source, has been proposed to enable the air conditioning of a passenger compartment while the engine is not running.

An electric motor having the same driving performance as the engine is large and does not fit in the engine room. Therefore, the electric motor to be provided in the compressor needs to be small. However, a small electric motor may cause a power swing due to an excessive compressor torque, particularly at the activation of the motor. When the electric motor causes a power swing, the electric motor stops and might hinder the air conditioning performance.

Japanese Laid-Open Patent Publication No. 10-236151 discloses such an air conditioning system. The disclosed air conditioning system employs a variable displacement compressor. Before actuating the compressor with an electric motor, the displacement of the compressor is minimized. Therefore, when the motor is activated, the compressor torque is small. Thus, the motor is reliably activated.

However, even after the motor is activated, or in a case where the motor is unlikely to cause power swing as compared to when the motor is being activated, the displacement of the compressor is maintained at the minimum. To drive the motor in a stable manner at the same time as performing the air conditioning in a suitable manner, the displacement of the compressor needs to be changed (increased) within the range that can be managed by the output of a small motor.

In a typical variable displacement compressor, the displacement is decreased when the pressure in a crank chamber is large and the displacement is increased when the pressure in the crank chamber is small. The compressor is provided with a control valve for adjusting the pressure in the crank chamber to vary the displacement. The control valve is, for example, located in a supply passage that connects the discharge chamber to the crank chamber. The control valve includes a bellows and an electromagnetic solenoid. The bellows moves a valve body in accordance with the pressure in the suction chamber (suction pressure). The electromagnetic solenoid applies force to the valve body based on external conditions, such as the temperature in the passenger compartment. The force that the solenoid applies to the valve body reflects the target value of the suction pressure (target suction pressure).

An operation for decreasing the temperature in the passenger compartment will now be described. A controller computes the target suction pressure based on the information from several sensors to decrease the detected room temperature to a desired temperature. The controller commands a drive circuit to supply current to the electromagnetic solenoid based on the computed result to decrease the opening degree of the valve body. The commands of the controller constitute commands externally to the electromagnetic solenoid. When the opening degree of the valve body is decreased, the amount of refrigerant supplied to the crank chamber through the supply passage from the discharge chamber decreases. Accordingly the crank pressure is decreased, which increases the displacement of the compressor. As a result, the cooling performance is increased and the temperature in the passenger compartment decreases toward the desired temperature. Accordingly, the actual suction pressure decreases toward the target suction pressure.

The bellows moves the valve body in accordance with the actual suction pressure such that the actual suction pressure seeks the target suction pressure. For example, when the suction pressure is greater than the target suction pressure, the bellows decreases the opening degree of the valve body. Therefore, as described above, the displacement of the compressor increases, which decreases the suction pressure toward the target suction pressure.

To reliably activate the motor, the control valve maintains the valve body at the fully opened position when the solenoid is demagnetized, and the displacement of the compressor is minimized.

However, the bellows of the control valve is automatically controlled based on the fluctuation of the suction pressure. Therefore, when the target suction pressure is changed by the solenoid, the movement of the bellows differs depending on the actual suction pressure at the time the target suction pressure is changed. The displacement of the compressor is changed in different manner based on the difference in the movement of the bellows.

More specifically, the compressor is stopped when the power source of the compressor is switched from the engine to the motor. When the compressor is stopped, the suction pressure excessively increases. Thus, even though the target pressure is set relatively high by the solenoid after the motor is activated, the bellows rapidly decreases the opening degree of the valve body to decrease the excessive actual suction pressure to the target suction pressure. As a result, the displacement of the compressor rapidly and excessively increases, which hinders the reliable activation of the motor.

The above described problem is caused not only in the case with the variable target suction pressure valve but in all types of control valves combining the pressure sensing mechanism and the electromagnetic actuator.

BRIEF SUMMARY OF THE INVENTION

Accordingly, it is an objective of the present invention to provide a vehicular air-conditioner that stabilizes the operation of an electric motor and performs air conditioning in a suitable manner at the same time when actuating a variable displacement compressor by an electric motor.

In order to achieve the above objective, the present invention provides an air conditioning system for a vehicle that is driven by a vehicle engine, said system has a compressor selectively operable by the vehicle engine and an electric motor outputting a force smaller than that of the vehicle engine, said electric motor being used as a drive force of the compressor when the vehicle engine is in a non-operative state, wherein said compressor compresses refrigerant gas introduced into a suction chamber from an external refrigerant circuit, wherein a displacement of the compressor is variable based on a differential pressure between the compression chamber and a crank chamber, wherein the compressor has a control valve that is disposed on a refrigerant passage communicating with the crank chamber, wherein said control valve has a valve plunger for changing an opening size of the control valve to adjust pressure in the crank chamber, said system comprising:

pressure sensing member disposed in the control valve and applying biasing force to the plunger based on pressure in the external circuit, wherein the biasing force is applied to cancel change of the pressure in the external circuit;

actuator disposed in the control valve and applying reverse force against the biasing force to the plunger, wherein the plunger is moved to increase the displacement by the reverse force; and controller for controlling the actuator to stepwise increase the reverse force by a magnitude at which the electric motor is able to stably drive the compressor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a flowchart showing an idling stop control of an air-conditioner ECU.

DETAILED DESCRIPTION OF THE PREFERRED EMBODIMENTS

A vehicular air-conditioner according to a preferred embodiment of the present invention will now be described.

Figure 1:
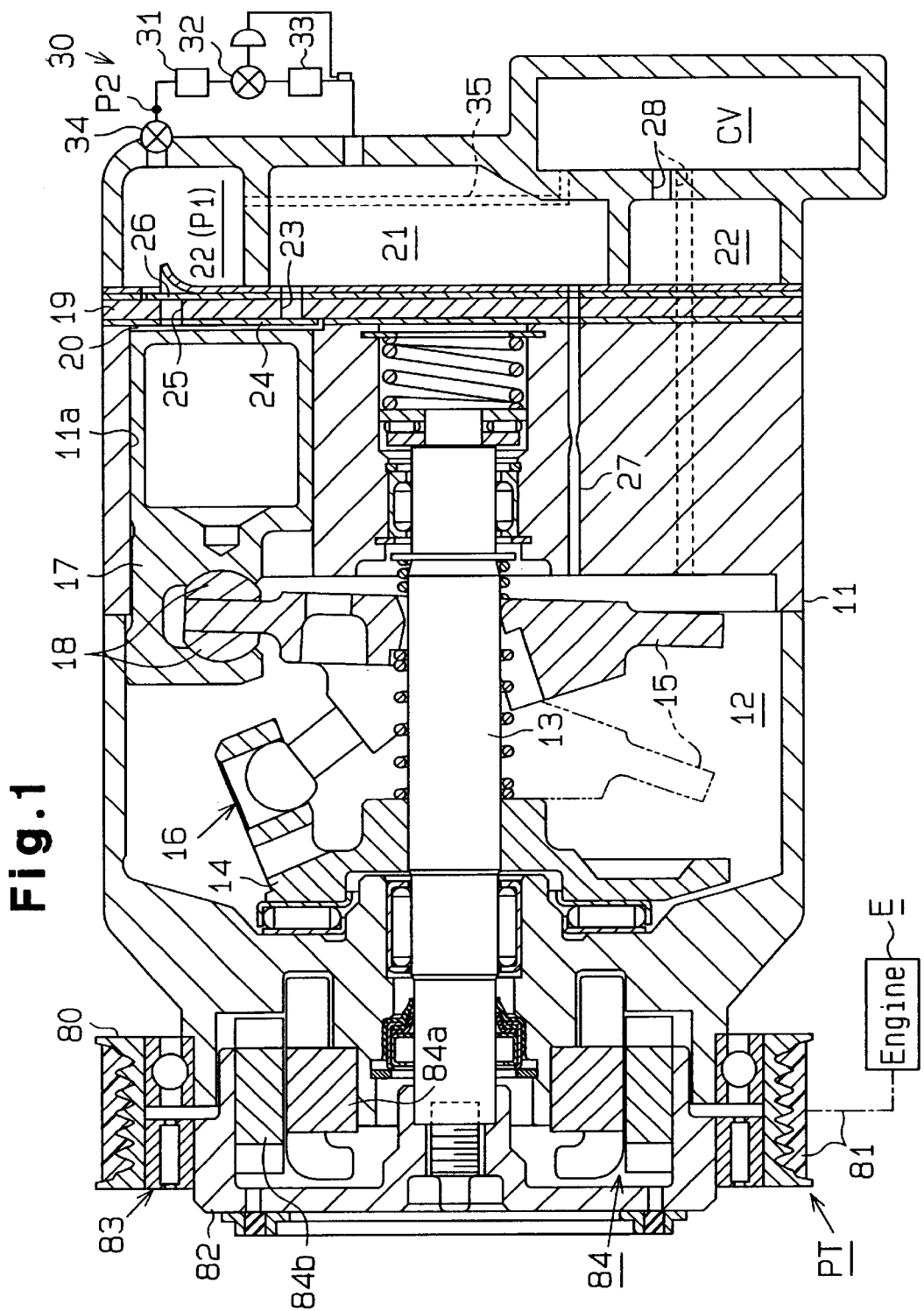
FIG. 1 is a cross-sectional view illustrating a swash plate type variable displacement compressor according to a preferred embodiment of the present invention.

As shown in FIG. 1, a swash plate type variable displacement compressor has a housing 11. The housing 11 defines a crank chamber 12. A drive shaft 13 is rotatably supported by the housing 11 and is located inside the crank chamber 12. The drive shaft 13 is connected to and driven by an output shaft of a vehicular power source, which is an engine E in this embodiment, by a power transmission mechanism PT.

The power transmission mechanism PT has a rotor 80, which is rotatably supported by the housing 11. A belt 81, which is operably connected to the output shaft of the engine E, is wound about the peripheral surface of the rotor 80. A hub 82 is secured to the end of the drive shaft 13 that projects from the housing 11. A conventional one-way clutch 83 is located between the rotor 80 and the hub 82.

The power transmission mechanism PT has an electric motor 84 located inside the rotor 80. The electric motor 84 includes a stator 84a, which is secured to the housing 11, and a rotor 84b, which is secured to the hub 82 and surrounds the periphery of the stator 84a. When the engine E is not running, an electronic control unit (ECU) 72 for an air-conditioner sends a command to a drive circuit 78. Then, power is supplied to the stator 84a from the drive circuit 78 as required based on the command (see FIG. 2). When power is supplied from the drive circuit 78 to the stator 84a, a rotational force is applied to the rotor 84b. When the rotor 84b is rotated, the drive shaft 13 is rotated via the hub 82. At this time, the one-way clutch 83 prevents power from being transmitted from the hub 82 to the rotor 80. Thus, the force of the electric motor 84 is prevented from being transmitted to the engine E.

The one-way clutch 83 permits the power transmission from the rotor 80 to the hub 82. Therefore, power from the engine E is transmitted to the drive shaft 13 via the rotor 80 and the hub 82.

A lug plate 14 is located in the crank chamber 12 and is secured to the drive shaft 13 to rotate integrally with the drive shaft 13. A swash plate 15 is located in the crank chamber 12. The swash plate 15 slides along the drive shaft 13 and inclines with respect to the axis of the drive shaft 13. A hinge mechanism 16 is provided between the lug plate 14 and the swash plate 15. The hinge mechanism 16 causes the swash plate 15 to rotate integrally with the lug plate 14 and the drive shaft 13 and to incline with respect to the drive shaft 13.

Cylinder bores 11a (only one shown) are formed in the housing 11. A single headed piston 17 is reciprocally accommodated in each cylinder bore 11a. Each piston 17 is coupled to the peripheral portion of the swash plate 15 by a pair of shoes 18. Therefore, when the swash plate 15 rotates with the drive shaft 13, the shoes 18 convert the rotation of the swash plate 15 into reciprocation of the pistons 17.

A valve plate assembly 19 is located in the rear portion of the housing 11. A compression chamber 20 is defined in each cylinder bore 11a by the associated piston 17 and the valve plate assembly 19. A suction chamber 21 and a discharge chamber 22 are defined in the rear portion of the housing 11. The valve plate assembly 19 has suction ports 23, suction valve flaps 24, discharge ports 25, and discharge valve flaps 26. Each set of the suction port 23, the suction valve flap 24, the discharge port 25, and the discharge valve flap 26 corresponds to one of the cylinder bores 11a.

When each piston 17 moves from the top dead center position to the bottom dead center position, refrigerant gas in the suction chamber 21 is drawn into the corresponding compression chamber 20 via the corresponding suction port 23 and suction valve flap 24. When each piston 17 moves from the bottom dead center position to the top dead center position, refrigerant gas in the corresponding compression chamber 20 is compressed to a predetermined pressure and is discharged to the discharge chamber 22 via the corresponding discharge port 25 and discharge valve flap 26.

As shown in FIG. 1, a bleed passage 27 and a supply passage 28 are located in the housing 11. The bleed passage 27 communicates the crank chamber 12 with the suction chamber 21. The supply passage 28 communicates the discharge chamber 22 with the crank chamber 12. A control valve CV is located in the supply passage 28 in the housing 11.

The opening degree of the control valve CV is adjusted to control the flow rate of highly pressurized gas supplied to the crank chamber 12 through the supply passage 28. The pressure in the crank chamber 12 is determined by the ratio of the gas supplied to the crank chamber 12 through the supply passage 28 and the flow rate of refrigerant gas conducted out from the crank chamber 12 through the bleed passage 27. As the pressure in the crank chamber 12 varies, the difference between the pressure in the crank chamber 12 and the pressure in the compression chamber 20 varies, which changes the inclination angle of the swash plate 15. Accordingly, the stroke of each piston 17, or the compressor displacement, is varied.

For example, when the pressure in the crank chamber 12 decreases, the difference between the pressure in the crank chamber 12 and the pressure in the compression chamber 20 decreases. Accordingly, the inclination angle of the swash plate 15 increases, which increases the displacement of the compressor. A chain double-dashed line in FIG. 1, represents the maximum inclination angle of the swash plate 15. In contrast, when the pressure in the crank chamber 12 increases, the difference between the pressure in the crank chamber 12 and the pressure in the compression chamber 20 increases. Accordingly, the inclination angle of the swash plate 15 decreases, which decreases the displacement of the compressor. A solid line in FIG. 1 represents the minimum inclination angle of the swash plate 15. The minimum inclination angle is not equal to zero.

As shown in FIG. 1, a refrigerant circuit, or a refrigeration cycle, of the vehicular air-conditioner includes the compressor and an external refrigerant circuit 30. The external refrigerant circuit 30 includes a condenser 31, an expansion valve 32, and an evaporator 33.

A first pressure monitoring point P1 is located in the discharge chamber 22. A second pressure monitoring point P2 is located in the refrigerant passage at a part that is spaced downstream from the first pressure monitoring point P1 toward the condenser 31 by a predetermined distance. The difference between the pressure PdH at the first pressure monitoring point P1 and the pressure PdL at the second pressure monitoring point P2 reflects the flow rate of refrigerant in the refrigerant circuit. That is, when the flow rate of refrigerant in the refrigeration circuit increases, the pressure difference ΔPd (ΔPd=PdH−PdL) between the first pressure monitoring point P1 and the second pressure monitoring point P2 increases. In contrast, when the flow rate of refrigerant is decreased, the pressure difference ΔPd is decreased.

The first pressure monitoring point P1 is communicated with the control valve CV by a first pressure introduction passage 35. The second pressure monitoring point P2 is communicated with the control valve CV by a second pressure introduction passage 36 (see FIG. 2).

A shutoff valve 34 is located in the refrigerant passage between the discharge chamber 22 and the condenser 31 of the refrigerant circuit. The shutoff valve 34 disconnects the refrigerant passage when the pressure in the discharge chamber 22 is lower than a predetermined value to stop the circulation of refrigerant via the external refrigerant circuit 30. The shutoff valve 34 may be a differential valve, which mechanically detects the difference between the pressure at its upstream section and its downstream section and operates accordingly. The shutoff valve 34 may also be an electromagnetic valve, which is controlled by the air-conditioner ECU 72 in accordance with the detected value of a discharge pressure sensor (not shown).

The shutoff valve 34 may also be a valve that mechanically operates in conjunction with the minimum inclination angle of the swash plate 15.

Figure 2:
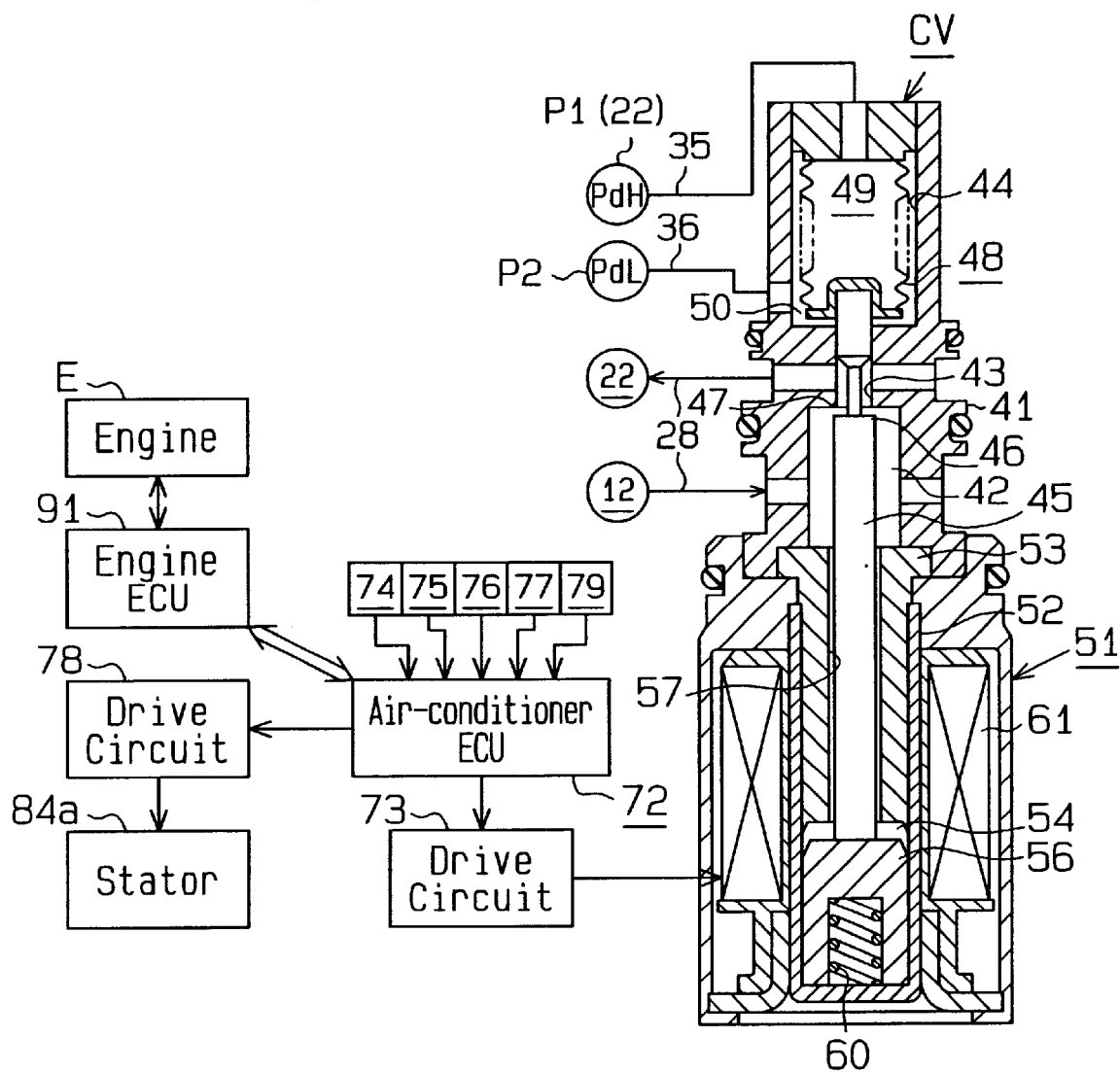
FIG. 2 is a cross-sectional view illustrating a control valve.

As shown in FIG. 2, the control valve CV has a valve housing 41 defines a valve chamber 42, a communication passage 43, and a pressure sensing chamber 44. A transmission rod 45 is located in the valve chamber 42 and the communication passage 43 and moves in the axial direction (vertically as viewed in FIG. 2).

The communication passage 43 and the pressure sensing chamber 44 are disconnected by the upper end of the transmission rod 45, which is inserted in the communication passage 43. The valve chamber 42 is communicated with the crank chamber 12 by a downstream portion of the supply passage 28. The communication passage 43 is communicated with the discharge chamber 22 by an upstream portion of the supply passage 28. The valve chamber 42 and the communication passage 43 forms a part of the supply passage 28.

A valve body 46 is formed at the middle portion of the transmission rod 45. The valve body 46 is arranged in the valve chamber 42. A step, which is defined by the valve chamber 42 and the communication passage 43, serves as a valve seat 47 and the communication passage 43 serves as a valve hole. When the transmission rod 45 moves from the lowermost position shown in FIG. 2 to the uppermost position, at which the valve body 46 contacts the valve seat 47, the communication passage 43 is disconnected. That is, the valve body 46 of the transmission rod 45 functions as a valve body for adjusting the opening degree of the supply passage 28.

A pressure sensing member, which is a bellows 48 in this embodiment, is accommodated in the pressure sensing chamber 44. The upper end of the bellows 48 is secured to the valve housing 41. The upper end of the transmission rod 45 is inserted into the lower end of the bellows 48. A first pressure chamber 49 and a second pressure chamber 50 are defined in the pressure sensing chamber 44 by the bellows 48. The first pressure chamber 49 is the inner space of the bellows 48. The second pressure chamber 50 is the outer space of the bellows 48. The first pressure chamber 49 is exposed to the pressure PdH at the first pressure monitoring point P1 via the first pressure introduction passage 35. The second pressure chamber 50 is exposed to the pressure PdL at the second pressure monitoring point P2 via the second pressure introduction passage 36. The bellows 48 and the pressure sensing chamber 44 form a pressure sensing mechanism.

An actuator for varying a target pressure, which is an electromagnetic actuator 51 in this embodiment, is located at the lower side of the valve housing 41. The electromagnetic actuator 51 has a cup-shaped cylinder 52 at the center of the valve housing 41. A stationary core 53 is inserted in the upper opening of the cylinder 52. The stationary core 53 defines a plunger chamber 54 at the lowermost portion of the cylinder 52.

A plunger, or a movable core 56 is accommodated in the plunger chamber 54 to move in the axial direction. A guide hole 57 is formed through the stationary core 53 extending in the axial direction. The lower end of the transmission rod 45 is located in the guide hole 57 to move in the axial direction. The lower end of the transmission rod 45 contacts the upper end of the movable core 56 inside the plunger chamber 54.

A spring 60 is accommodated between the inner bottom surface of the cylinder 52 and the movable core 56 in the plunger chamber 54. The spring 60 urges the movable core 56 toward the transmission rod 45. The transmission rod 45 is urged toward the movable core 56 by the bellows 48. Therefore, the movable core 56 and the transmission rod 45 always move integrally in a vertical direction. The force of the bellows 48 is greater than the spring 60.

A coil 61 is wound about at least a part of the stationary core 53 and the movable core 56. The air-conditioner ECU 72 sends a command to a drive circuit 73 based on, for example, an on-off switch, which is an air-conditioner switch 74 in this embodiment, a temperature adjuster 75 for setting the passenger compartment temperature, a temperature sensor 76 for detecting the passenger compartment temperature, a rotational speed sensor 77 for detecting the rotational speed Ne of the electric motor 84, and a current sensor for detecting the current I applied to the stator 84*a* of the electric motor 84. The drive circuit 73 supplies current to the coil 61 based on the command.

The coil 61 generates an electromagnetic force that corresponds to the value of the current from the drive circuit 78 between the movable core 56 and the stationary core 53. The electromagnetic force is transmitted to the transmission rod 45 by the movable core 56. The current to the coil 61 is controlled by adjusting the applied voltage. In the preferred embodiment, the applied voltage is controlled by pulse-width modulation PWM. Therefore, the duty ratio Dt that the air-conditioner ECU 72 commands the drive circuit 73 to send to the coil 61 corresponds to a command value from the air-conditioner ECU 72 to the electromagnetic actuator 51.

In the control valve CV, the position of the transmission rod 45 and the opening degree of the valve body 46 are determined in the following manner.

When no current is supplied to the coil 61, or when the duty ratio Dt is zero percent, the bellows 48 positions the transmission rod 45 at the lowermost position shown in FIG. 2. Thus, the valve body 46 fully opens the communication passage 43. Therefore, the pressure in the crank chamber 12 is maximized. At this time, the difference between the pressure in the crank chamber 12 and the pressure in the compression chambers 20 is great and the inclination angle of the swash plate 15 is minimized, which minimizes the displacement of the compressor.

When no current is supplied to the coil 61, the pressure sensing mechanism stops functioning automatically. This minimizes the displacement of the compressor regardless of the fluctuation of the pressure difference ΔPd.

When the displacement of the compressor is minimum, the pressure acting on the shutoff valve 34 on the side facing the discharge chamber 22 is lower than a predetermined value and thus the shutoff valve 34 is closed. Therefore, the circulation of refrigerant via the external refrigerant circuit 30 is stopped. Thus, even when the compressor continues to compress refrigerant gas, air conditioning is not performed unnecessarily.

When a current of a minimum duty ratio Dt (min), which is greater than 0%, is supplied to the coil 61 of the control valve CV, the resultant of the upward forces of the spring 60 and the electromagnetic force surpasses the downward force of the bellows 48, which moves the transmission rod 45 upward. In this state, the resultant of the upward forces of the spring 60 and the electromagnetic force acts against the resultant of the force based on the pressure difference ΔPd and the downward force of the bellows 48. The position of the valve body 46 of the transmission rod 45 relative to the valve seat 47 is determined such that upward and downward forces are balanced. Accordingly, the displacement of the compressor is adjusted.

As described above, the target value (target pressure difference) of the pressure difference ΔPd is determined by the duty ratio Dt of current supplied to the coil 61. The control valve CV automatically determines the position of the transmission rod 45 (the valve body 46) according to changes of the pressure difference ΔPd to maintain the target value of the pressure difference ΔPd.

When the engine E is running, the air-conditioner ECU 72 calculates the duty ratio Dt based on the detected temperature from the temperature sensor 76 and the target temperature from the temperature adjuster 75 while the air-conditioner switch 74 is on. The air-conditioner ECU 72 sends the calculated value to the drive circuit 73.

For example, when the detected temperature is greater than the target temperature, the passenger compartment is hot and the thermal load is great. Therefore, the air-conditioner ECU 72 commands the drive circuit 73 to increase the duty ratio Dt. Accordingly, the opening degree of the control valve CV is decreased, which increases the displacement of the compressor. The increased compressor displacement lowers the temperature at the evaporator 33 and lowers the temperature in the passenger compartment.

In contrast, when the detected temperature is less than the target temperature, the passenger compartment is cold and the thermal load is small. Therefore, the air-conditioner ECU 72 commands the drive circuit 73 to decrease the duty ratio Dt. Accordingly, the opening degree of the control valve CV is increased, which decreases the displacement of the compressor. The decreased compressor displacement lowers the heat reduction performance of the evaporator 33 and raises the temperature in the passenger compartment.

The air-conditioner ECU 72 executes computation according to the following flowchart of FIG. 3 when certain conditions are satisfied. The conditions include that the air-conditioner switch 74 is on and that the air-conditioner ECU 72 has received information from an engine ECU 91 that the engine E is determined to be stopped in the process of the idling stop control. The engine ECU 91 is a computer for controlling start, stop, and output of the engine E. The engine ECU 91 is connected to the air-conditioner ECU 72 (see FIG. 2).

As shown in FIG. 3, when receiving information from the engine ECU 91 that the engine E is determined to be stopped while the air-conditioner switch 74 is on, the air-conditioner ECU 72 proceeds to step S201. In step S201, the air-conditioner ECU 72 gives zero to the duty ratio Dt sent to the drive circuit 73. Thus, no current is supplied to the coil 61, which minimizes the displacement of the compressor. The compressor displacement is minimized before the engine E is stopped. In step S202, the air-conditioner ECU 72 stands by until it receives a signal from the engine ECU 91 representing that the engine E is stopped. The air-conditioner ECU 72 determines that the engine E is stopped when the rotational speed information of the engine E sent from the engine ECU 91 is zero.

If it is determined that the engine E is stopped in step S202, the air-conditioner ECU 72 proceeds to step S203. In step S203, the air-conditioner ECU 72 sends a command to the drive circuit 78 to activate the electric motor 84. The drive circuit 78 activates the electric motor 84 at a substantially constant rotational speed, or at a first threshold value Ne(set 1). When the electric motor 84 is accelerated and reaches the first threshold value Ne(set 1), the electric motor 84 is operated in a stable manner. In step S204, it is determined whether the electric motor 84 has reached a predetermined rotational speed, which is the first threshold value Ne(set 1), and has shifted to a stable operation state based on a signal from the rotational speed sensor 77.

If it is determined that the rotational speed Ne(t) of the electric motor 84 has shifted to the stable operation state in step S204, the air-conditioner ECU 72 proceeds to step S205. In step S205, the air-conditioner ECU 72 sends a minimum duty ratio Dt (min) to the drive circuit 73 and actuates an automatic control function (target pressure difference maintaining function) in the control valve CV. Then, the air-conditioner ECU 72 proceeds to step S206. In step S206, the air-conditioner ECU 72 increases the duty ratio Dt by a unit quantity ΔD and commands the drive circuit 73 to change the duty ratio Dt to the modified value (DT+ΔD).

Therefore, the opening degree of the control valve CV slightly decreases, which slightly suppresses the pressure increase in the crank chamber 12. Accordingly, the displacement of the compressor is slightly increased, thereby slightly increasing the compressor torque.

In step S207, the air-conditioner ECU 72 determines whether the rotational speed Ne detected by the rotational speed sensor 77 is less than the second threshold value Ne(set 2)(Ne(set 2)<Ne(set 1)) and the current value I detected by the current sensor 79 is greater than a first threshold value I (set 1). The rotational speed Ne of the electric motor 84 and the current value I each correlate with the compressor torque applied to the electric motor 84. That is, if the rotational speed Ne is less than the second threshold value Ne(set 2) and the current value I is greater than the first threshold value I(set 1), the compressor torque can become excessive for the electric motor 84 to operate in a suitable manner.

If the decision outcome of step S207 is negative, it is determined that the capacity of the electric motor 84 is enough for the current compressor torque and the air-conditioner ECU 72 proceeds to step S208. In step S208, it is determined whether the duty ratio Dt has reached a predetermined value Dt(set). The predetermined value Dt(set) represents the target pressure difference of the control valve CV. The target pressure difference is the pressure difference ΔPd obtained when the displacement of the compressor is at the middle of the minimum value and the maximum value. The middle displacement is determined such that, although depending on other conditions, the compressor torque is substantially at the upper limit within the range of the capacity of the electric motor 84.

If the decision outcome of step S208 is negative, the air-conditioner ECU 72 proceeds to step S206. In step S206, the duty ratio Dt is increased by the unit quantity ΔD until the duty ratio Dt reaches the predetermined value Dt(set). The value of the unit quantity ΔD is predetermined such that the unit quantity ΔD must be added several times to reach the predetermined value Dt(set) from the minimum duty ratio Dt(set) in step S206. If the decision outcome of step S208 is positive, or the duty ratio Dt has reached the predetermined value Dt(set), the air-conditioner ECU 72 proceeds to step S207. In step S207, the duty ratio Dt is maintained at the predetermined value Dt(set).

That is, the air-conditioner ECU 72 drives the compressor at the upper limit within the range of the capacity of the electric motor 84, which is determined based on the second threshold value Ne(set 2) of the motor speed and the first threshold value I(set 1) of the current, regardless of the target temperature of the temperature adjuster 75 and the temperature detected by the temperature sensor 76. This is because the size of the electric motor 84 is restricted since the electric motor 84 is incorporated in the power transmission mechanism PT, the dimension of which is restricted by the pulley ratio with respect to the engine E. That is, the output of the small electric motor 84 is less than that of the engine E and thus the capacity for driving the compressor is also designed to be smaller than that of the engine E. The electric motor 84 is constantly driven at the upper limit of its capacity to drive the compressor.

If the decision outcome of step S207 is positive, it is determined that the compressor torque is excessive and the electric motor 84 tends to operate unstably, such as causing power swing, and the air-conditioner ECU 72 proceeds to step S209. In step S209, the air-conditioner ECU 72 decreases the duty ratio Dt by the unit quantity ΔD. The air-conditioner ECU 72 then commands the drive circuit 73 to change the duty ratio Dt to the modified value (Dt−ΔD).

Therefore, the opening degree of the control valve CV is slightly increased, which increases the pressure in the crank chamber 12. Accordingly, the displacement of the compressor is slightly decreased, which slightly lowers the compressor torque.

After step S209, the air-conditioner ECU 72 proceeds to step S210. In step S210, it is determined whether the rotational speed Ne of the electric motor 84 is less than the third threshold value Ne(set 3)(Ne(set 3)<Ne(set 2)) and the current value I detected by the current sensor 79 is greater than the second threshold value I(set 2)(I(set 2)>I(set 1)). If it is determined that the rotational speed Ne is less than the third threshold value Ne(set 3) and the current value I is greater than the second threshold value I(set 2), the compressor torque is excessive for the capacity of the electric motor 84. Therefore, if the compressor is kept driven by the electric motor 84 in this state, the electric motor 84 is most likely to cause power swing.

If the decision outcome of step S210 is negative, the air-conditioner ECU 72 returns to step S207. In contrast, if the decision outcome of step S210 is positive, the air-conditioner ECU 72 proceeds to step S211. In step S211, the air-conditioner ECU 72 gives zero to the duty ratio Dt sent to the drive circuit 73. Thus, no current is applied to the coil 61, which minimizes the displacement of the compressor. Then, the air-conditioner ECU 72 proceeds to step S212. In step S212, the air-conditioner ECU 72 commands the drive circuit 78 to stop the electric motor 84. Then, the air-conditioner ECU 72 returns to step S203. In step S203, the electric motor 84 is reactivated. That is, if the electric motor 84 is driven unstably due to power swing for a long time, the air-conditioner is adversely affected. Thus, air-conditioner ECU 72 stops and reactivates the electric motor 84 to promptly stabilize the operation of the electric motor 84.

The present invention provides the following advantages.

According to the above control, during idling stop, the duty ratio Dt is increased to the target value Dt (set) by adding the unit quantity ΔD several times (S206 of FIG. 3). Therefore, it takes a long time from when the electric motor 84 is activated till the duty ratio Dt is increased to the target value Dt(set). That is, the duty ratio Dt is gradually increased, or increased in steps. As a result, when the target pressure difference is changed to actuate the bellows 48, increasing of the pressure difference ΔPd is not delayed greatly. Thus, the difference between the target pressure difference and the pressure difference ΔPd is prevented from increasing excessively.

As described above, the opening degree of the valve body 46 is prevented from rapidly and excessively increasing when increasing the pressure difference ΔPd to the target pressure difference. This prevents the compressor displacement from being rapidly and excessively increased. Accordingly, the compressor torque is prevented from increasing to a level that the capacity of the electric motor 84 cannot manage. Thus, even when the compressor displacement is increased, the electric motor 84 is unlikely to cause power swing. As a result, the operation of the electric motor 84 is stabilized and air conditioning is performed in a suitable manner at the same time.

According to the idling stop control, the duty ratio Dt is changed from the minimum value Dt(min) to the target value Dt(set) more slowly than in a case where the duty ratio Dt is changed from the minimum value Dt(min) to the target value Dt(set) in accordance with the cooling load while the engine E is running. Changing of the duty ratio Dt to the target value Dt(set) is slower even when the duty ratio Dt is not changed step by step going through step S209 (decreasing process of the duty ratio Dt).

The air-conditioner ECU 72 gradually increases the duty ratio Dt at least immediately after the electric motor 84 is activated. Since the compressor torque is likely to become excessive, or overshoot, immediately after the electric motor 84 is started, it is particularly important to gradually increase the duty ratio Dt immediately after the electric motor 84 is activated to operate the electric motor 84 in a stable manner.

The air-conditioner ECU 72 minimizes the compressor displacement before activating the electric motor 84 when driving the compressor by the electric motor 84. Therefore, the electric motor 84 is activated in a stable manner without causing power swing. Thus, reliability of the air-conditioner is improved.

The air-conditioner ECU 72 restricts increasing of the duty ratio Dt such that the compressor torque does not become excessive when actuating the compressor by the electric motor 84 (step S208 in FIG. 3). Therefore, the compressor is operated at the upper limit of the capacity of the electric motor 84. As a result, the operation of the electric motor 84 is stabilized and air conditioning is performed in a suitable manner at the same time.

If the compressor torque is excessive when driving the compressor by the electric motor 84, the air-conditioner ECU 72 decreases the duty ratio Dt (step S207 (positive) and step S209 in FIG. 3). Therefore, the compressor torque is reliably suppressed within the range that the capacity of the electric motor 84 can manage. As a result, the operation of the electric motor 84 is stabilized and air conditioning is performed in a suitable manner at the same time.

If the electric motor 84 causes power swing, the air-conditioner ECU 72 stops and reactivates the electric motor 84. Therefore, the electric motor 84 is prevented from being operated unstably for a long time. The air-conditioner is prevented from being adversely affected by the unstable operation.

It should be apparent to those skilled in the art that the present invention may be embodied in many other specific forms without departing from the spirit or scope of the invention. Particularly, it should be understood that the invention may be embodied in the following forms.

A torque sensor for directly sensing the compressor torque may be provided. In this case, determinations in step S207 and S210 are performed based on the information detected by the torque sensor. Thus, the compressor torque is directly obtained. As a result, the operation of the electric motor 84 is stabilized and air conditioning is performed in a suitable manner at the same time.

Determinations in step S207 and/or S210 in FIG. 3 may be performed in accordance with one of the rotational speed Ne of the electric motor 84 and the current value I. In this case, the computing load of the air-conditioner ECU 72 is reduced.

The target value Dt(set) in step S208 of FIG. 3 may be determined by feedback control based on the information obtained from the relationship between the air temperature just downstream of the evaporator 33 and the compressor torque, which are measured in advance.

For example, an electric motor having higher performance than the electric motor 84 of the preferred embodiment may be used. In this case, the target value Dt(set) is varied in accordance with the cooling load in step S208 of FIG. 3. This improves the performance of air-conditioning.

The first pressure monitoring point P1 may be located at the suction pressure zone between the evaporator 33 and the suction chamber 21 and the second pressure monitoring point P2 may be located downstream of the first pressure monitoring point P1 in the suction pressure zone.

A variable target suction pressure valve may be used instead of the control valve CV.

The control valve CV may be located in the bleed passage 27 instead of the supply passage 28. In this case, the pressure in the crank chamber 12 is adjusted by the opening degree of the bleed passage 27.

The present invention may be embodied in a wobble type variable displacement compressor.

The present invention need not be embodied in a vehicular air-conditioner for conditioning a passenger compartment. For example, the present invention may be embodied in a vehicular air-conditioner for conditioning inside a freezer car or a refrigeration car.

Therefore, the present examples and embodiments are to be considered as illustrative and not restrictive and the invention is not to be limited to the details given herein, but may be modified within the scope and equivalence of the appended claims.

What is claimed is:

1. An air conditioning system for a vehicle that is driven by a vehicular power source, said air conditioning system comprising:

a compressor selectively operable by the vehicular power source and an electric motor, said electric motor being used as a drive source of the compressor when the vehicular power source is in a non-operative state, said compressor including a crank chamber connected to an external refrigerant circuit, with displacement of the compressor being variable based on pressure in the crank chamber, the compressor including a control valve disposed on a refrigerant passage communicating with the crank chamber, said control valve having a valve body for changing an opening size of the refrigerant passage to control the pressure in the crank chamber, said air conditioning system further comprising:

a pressure sensing member disposed in the control valve and actuating the valve body based on pressure in the external circuit so as to cancel change of pressure in the external circuit;

an actuator disposed in the control valve and applying a force to the pressure sensing member, the magnitude of which corresponds to an external command;

a controller for controlling the actuator to change the external command in steps until the external command reaches a predetermined value while the electric motor operates the compressor;

a rotational speed sensor for detecting a rotational speed of the motor; and a current sensor for detecting magnitude of current flows through the motor, wherein the controller includes a determining means for determining when the output force of the motor is insufficient to stably drive the compressor based on at least one of the rotational speed and the magnitude of current flow through the motor and based on a threshold value that is stored in the controller, the controller including a correcting means for controlling the actuator so as to decrease the displacement of the compressor based on the determination of the determining means.

2. An air conditioning system according to claim 1, further comprising:

a discharge chamber disposed in the compressor, said discharge chamber being arranged to receive a refrigerant gas compressed in the compressor;

a pair of monitoring points disposed respectively in the external circuit and the discharge chamber for monitoring pressure at each of the monitoring points;

said refrigerant passage connecting the discharge chamber and the crank chamber; and said pressure sensing member including a bellows that expands and shrinks according to a differential pressure between said pair of monitoring points, said bellows being coupled to the valve body.

3. An air conditioning system according to claim 1, wherein said actuator includes an electromagnetic solenoid for applying said force to the valve body when energized by electric current.

4. An air conditioning system according to claim 3, wherein said force is in proportion to a duty ratio of the electric current applied to the electromagnetic solenoid.

5. An air conditioning system according to claim 4 wherein the determining means for determining when the output force of the motor is insufficient to stably drive the compressor makes the determination based on both of the rotational speed and the magnitude of the current flow through the motor.

6. An air conditioning system according to claim 5, wherein said correcting means decreases the duty ratio in steps.

7. An air conditioning system according to claim 5, wherein said correcting means resets the duty ratio.

8. An air conditioning system according to claim 1, wherein the electric motor outputs force smaller than that of the vehicular power source.

9. An air conditioning system according to claim 1, wherein the change in steps is performed by an increment that is predetermined such that the increment must be added several times to reach the predetermined value.

10. An air conditioning system according to claim 1, wherein the controller changes the external command in steps when the target pressure of the control valve is changed so as to increase a displacement of the variable compressor in a period after activating the electric motor.

11. An air conditioning system according to claim 1, wherein the controller minimizes a displacement of the variable compressor before activating the electric motor.

12. An air conditioning system according to claim 1, wherein the controller places a limitation on an amount of change in target pressure of the control valve while the compressor is driven by the electric motor, in the case where the displacement of the variable compressor is increased.

13. An air conditioning system according to claim 1, further comprising:

a first detector for detecting a rotational speed of the electric motor; and a second detector for detecting a magnitude of electric current flowing in the electric motor, wherein the controller includes a determining means for determining the output force of the motor that is insufficient to stably drive the compressor and a motor controller, and said motor controller stops operation of the electric motor and restarts operation based on a determination of the determining means.

14. An air conditioning system according to claim 1, further comprising a housing of the compressor and a power transmission, wherein said power transmission includes a rotor that is rotatably supported by the housing and the electric motor.

* * * * *